United States Patent [19]

Poon et al.

[11] Patent Number: 5,774,346

[45] Date of Patent: Jun. 30, 1998

[54] FAMILY OF ZERO VOLTAGE SWITCHING DC TO DC CONVERTERS WITH COUPLED OUTPUT INDUCTOR

[76] Inventors: Franki Ngai Kit Poon, Flat 4, 12/F, Yee Mei House,Yee Kok Court, 341 Cheung Sha Wan Road, Kowloon; Man Hay Pong, Room 1616, Block D, Kornhill, Quarry Bay, both of Hong Kong

[21] Appl. No.: 787,296

[22] Filed: Jan. 24, 1997

[51] Int. Cl.$^6$ .................................................... H02M 3/335
[52] U.S. Cl. ................................ 363/17; 363/98; 363/41; 363/132; 323/235; 323/222; 323/224
[58] Field of Search ..................................... 323/224, 235, 323/222; 363/17, 98, 132, 40, 41

[56] References Cited

U.S. PATENT DOCUMENTS

| | | | |
|---|---|---|---|
| 4,855,888 | 8/1989 | Henze et al. ................................ | 363/17 |
| 5,066,900 | 11/1991 | Bassett ..................................... | 323/224 |
| 5,159,541 | 10/1992 | Jain ........................................... | 363/26 |
| 5,402,329 | 3/1995 | Wittenbreder, Jr. ........................ | 363/16 |
| 5,539,630 | 7/1996 | Pietkiewicz et al. ...................... | 363/17 |

Primary Examiner—Robert Nappi
Assistant Examiner—Shawn Riley

[57] ABSTRACT

A family of power converter is invented. Each of these converter accomplishes zero voltage switching to minimize switching losses. Also by the application of coupled inductor, conduction losses can also be minimized. The basic embodiment comprises of two switches connected across the input source. The switches are driven by asymmetrical driving pulses with variable duty cycle. A capacitor is connected to the node joining the two switches and an inductor is in turn connected to it. This inductor is connected to an output filter through a diode. The output filter comprises of an inductor and capacitor and diode combinations. This output filter inductor has two coupled windings which minimize conduction losses. The basic embodiment can be modified to provide converter with boost output or negative output. The embodiment can also be modified for isolated converter with transformer in both half bridge and full bridge circuit.

6 Claims, 16 Drawing Sheets

FAMILY OF ZERO VOLTAGE SWITCHING DC TO DC CONVERTERS WITH COUPLED OUTPUT INDUCTOR

BACKGROUND OF THE INVENTION

This invention relates generally to DC-DC power converters with minimized switching losses.

Switching converters are widely used to convert electrical energy from one voltage level to another voltage level. These converters usually operate at high frequencies and switching losses of switching devices and conduction losses in circuit are major causes of converter losses. A lot of work have been done which attempt to reduce switching losses and Zero Voltage Switching (ZVS) is a promising way especially when the semiconductor switches are field effect transistors with considerable device capacitances. Resonant converters with sinusoidal voltage or current transitions are widely discussed but these circuits impose excessive voltage or current stresses upon semiconductor switches and make them impractical to be used widely. There are modifications based upon resonant converters like the multi-resonant converters but the analysis and control of these converters are too complicated and are again difficult to be applied to commercial products.

FIG. 1 shows a prior art circuit proposed by K. Harada, et al, who makes use of a saturable inductor in a half bridge circuit. When one of the switches in the half bridge circuit switches off, current retained in an inductor in the circuit shown in FIG. 1 exchange charges in the parasitic capacitances in parallel with the two switches. This creates a zero voltage transition for one of the switches. The switch is then turned on and Zero Voltage Switching (ZVS) is achieved.

FIG. 2 shows a prior art ZVS circuit invented by C. P. Henze, et al, in U.S. Pat. No. 5,057,986. In this circuit two switches in a half bridge configuration turn on and off alternately which drive a series combination of the primary winding of a transformer and a capacitor. A third switch is used on the secondary side which synchronizes with the upper switch on the primary side. However, this converter provides ZVS only at relatively low load current, as it is pointed out that the transformer magnetizing current must have peak-to-peak amplitude greater than twice the load current contributions to the primary side. In this case the total primary current is a lot higher than it should be if magnetizing current had not been so high, and this induces unnecessary conduction losses in the switches on the primary side. Furthermore, energy is transferred by a store and discharge manner. The capacitor on the primary side is charged up when the lower switch is turned on and energy is delivered to the secondary side when the upper switch is turned on. This mechanism increases losses in components which act as energy buffer. The capacitor connected in parallel with the load takes high pulsating current in the order of the load current. This will cause high voltage ripples at the load and special capacitors with low series resistance must be used and the product cost will be burdened. Also this will increase losses through the output diode.

Wittenbreder, Jr. proposed a similar configuration in U.S. Pat. No. 5,402,329. In his circuit an inductor is added in series with a capacitor on the primary side of a transfomer. This increases the range in which Zero Voltage Switching can be obtained. However, the output capacitor has to take up high ripple current and this results in high conduction losses through the output diode. This also has the disadvantage of high output voltage ripple.

All these prior art pay no attention to reduction of conduction losses, which constitutes a significant portion of total device losses.

This document describes the invention of a family of DC to DC converters which reduce both switching losses and conduction losses. This converter family retains ZVS over a wide load current range and excessively high magnetizing current is not necessary. Also, by the effect of the output coupled inductor, conduction losses are reduced. This family of converters transfer energy directly from the source to the load and comprises a coupled output inductor capacitor filter combination which not only greatly reduces output ripple voltage but also bring in totally different operation mechanisms. The basic circuit comprises of a minimum number of components for simple and high efficiency step down operations. A member circuit provide the means for step up operation and another provides output with a reverse voltage polarity. Transformers are used in other member circuits of this converter family for isolation purpose.

SUMMARY OF THE INVENTION

A family of power converters is invented which enables high efficiency power conversion. The basic embodiment of the invention is a DC to DC step down power converter. It comprises of two input terminals which can be coupled to a DC source, two output terminals which can be coupled to a DC load. It further comprises first and second switches connected in series across the input terminals. Each switch having a first and a second switch terminals and a control terminal, and a switch diode with its anode connected to the second switch terminal and the cathode connected to the first switch terminal. This switch diode may be a component external to the switch or an integrated part of the switch. A first capacitor is connected to the junction of the first and second switch, the other end of the capacitor is then connected to the first terminal of a first inductor, the second terminal of this first inductor is connected to the second terminal of the second switch, which is connected to second terminal of the DC source. The first terminal of the first inductor is connected in series with a second inductor which in turn is connected to a third inductor. This third inductor is then connected to the anode of a third diode and the cathode of this third diode is connected to the cathode of a fourth diode. The anode of the fourth diode is connected to one of the two input terminals which has lower potential. The node connecting the cathodes of the third and the fourth diode is connected to a fourth inductor. This fourth inductor is connected to a second capacitor, which is the output capacitor. The other end of this output capacitor is connected to the input terminal with lower potential. The third and the fourth inductor are magnetically coupled. The output capacitor, the third and the fourth inductor make up a special inductor-capacitor filter for output voltage ripple reduction and conduction loss reduction. A DC load is connected across the output capacitor.

During operation the first and second switches periodically and alternately open and close. After one switch turns off a small time gap is lapsed before the turning on of the other switch. This small time gap prevents short circuiting of the input source and it also allows time for the voltage of one device to fall to zero before it switches on, thus enabling Zero Voltage Switching.

Furthermore, this converter family comprises of embodiments for generation of output with negative voltage, step up voltage operation and full bridge configurations. The family also comprises of embodiments with transformer isolation in half bridge and half bridge configurations. This converter family provides a means for high efficiency power conversion and the very versatile embodiments provide full coverage of various requirements.

DESCRIPTION OF THE PREFERRED EMBODIMENT

Figure 1:
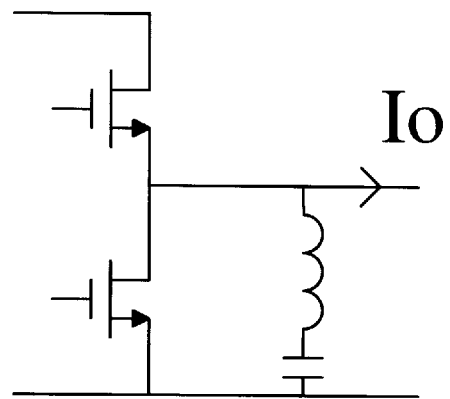
FIG. 1 is a schematic diagram of a prior art zero voltage switching power converter.
Figure 2:
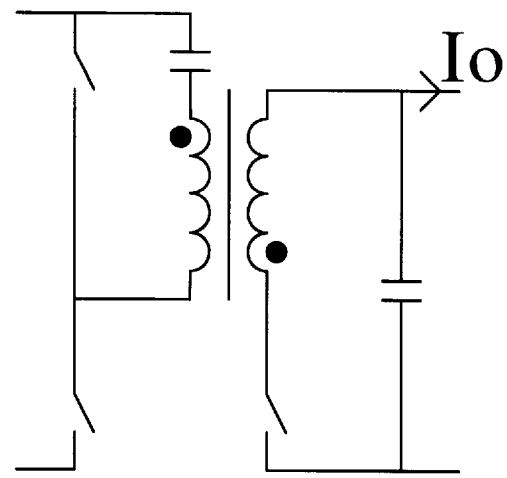
FIG. 2 is a schematic diagram of a prior art zero voltage switching power converter with transformer isolation.
Figure 3:
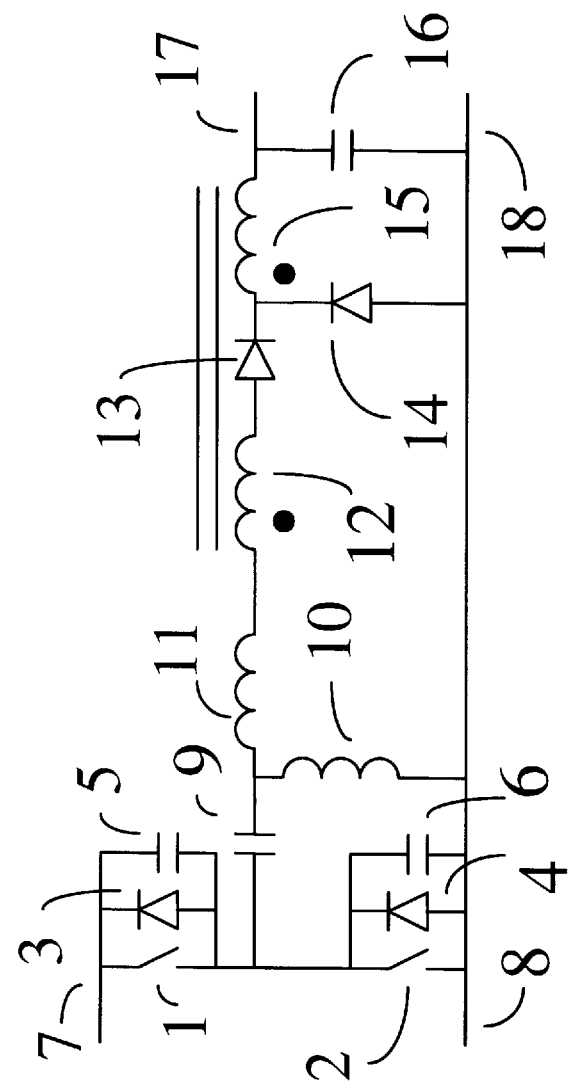
FIG. 3 is the schematic diagram of a basic embodiment of the converter family in accordance with the present invention.

A basic embodiment of the present invention is shown in FIG. 3. Two switches 1 and 2 are connected across a pair of input terminals. Diodes 3 and 4 are connected in antiparallel with these switches. These switches are typically semiconductor devices like Field Effect Transistor (MOSFET). Capacitors 5 and 6 can be external components or they can simply be parasitic capacitance of these switches. Similarly diodes 3 and 4 can be external components or they can be parasitic diodes of Field Effect Transistors. In addition to the switches, the circuit comprises of a DC blocking capacitor 9, inductors 10 and 11, two inductors 12 and 15 which are magnetically coupled together, two diodes 13 and 14, and output filter capacitor 16.

Figure 4:
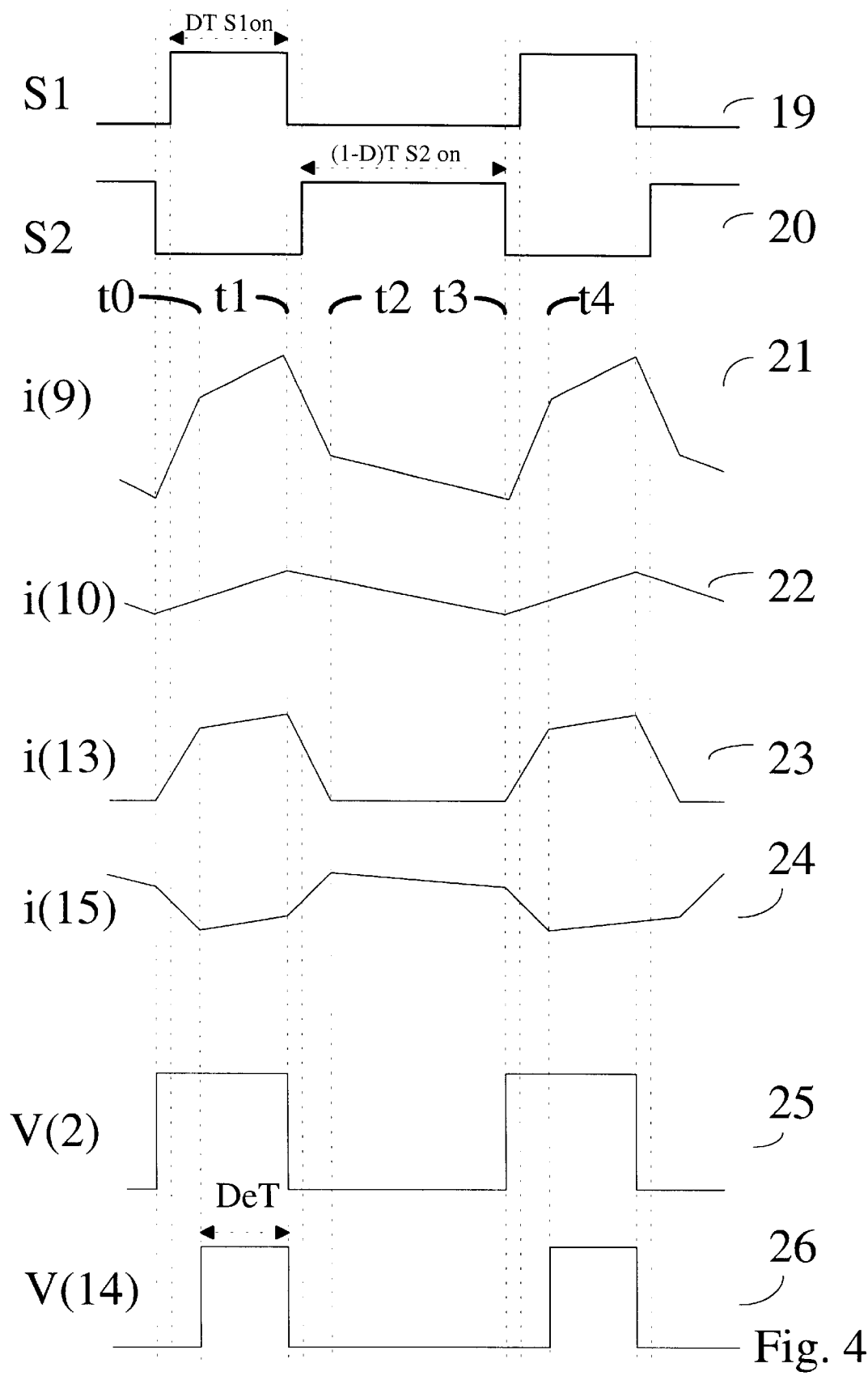
FIG. 4 shows timing diagrams which illustrate operations of the power converter shown in FIG. 3.

Switches 1 and 2 are driven on and off alternately and the driving waveforms are 19 and 20 as shown in FIG. 4. When switch 1 is turned on switch 2 is turned off, and vice versa. There is a time gap between the turning off of one switch and the turning on of the other switch so that there is no chance that both switches are turned on simultaneously and cause a short circuit of the input source. This pre-determined time gap also enables Zero Voltage Switching. In general, this time gap is small compared to the period of the switching waveform. The frequency of the switching waveforms are fixed but the duty cycle, i.e., the ratio of the closure time of switch 1 to the period, can be varied from 0 to 1. The duty cycle regulate the output voltage of the converter.

Circuit operations in different time periods shown in FIG. 4 are described in following paragraphs.

Time Period [t0-t1]

Figure 5A:
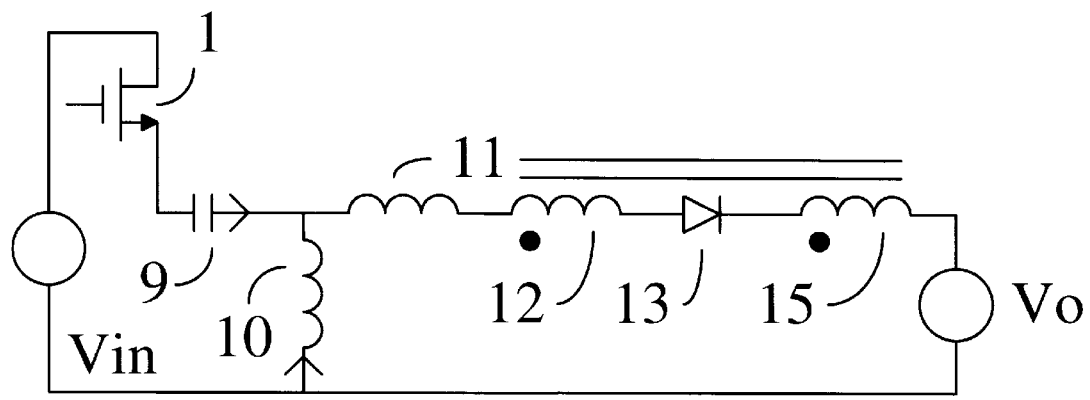
FIG. 5a to FIG. 5d represent simplified schematic drawings of switching stages of the converter shown in FIG. 3.

The circuit operation can be understood by considering the time period when switch 1 is turned on. Current flows through switch 1, capacitor 9, inductors 11 (L2) and 12 (L3), diode 13 and through another inductor 15 (L4) to the output load. The output capacitor 16 is chosen to have a value large enough such that the output voltage is assumed to be constant within a switching cycle. Current also flows in inductor 10 (L1) as magnetizing current. It is assumed that filter inductor 15 has a value large enough such that the current through which remains non zero within a switching cycle, in other words the converter operates in the continuous conduction mode for this discussion. (Note that the converter will also operate in discontinuous mode) The equivalent circuit during this time period is shown in FIG. 5a. In this time period energy is delivered to the output load. The capacitor 9 is chosen to have a value large enough so that its voltage can be considered constant within one switching cycle. Since inductors 12 and 15 are magnetically coupled together and wound on the same core, physically it looks as if they were a single lumped inductor. In this circuit mode a voltage is developed across inductor 10 and its current rises in an almost linear manner.

Time Period [t1-t2]

Figure 5B:
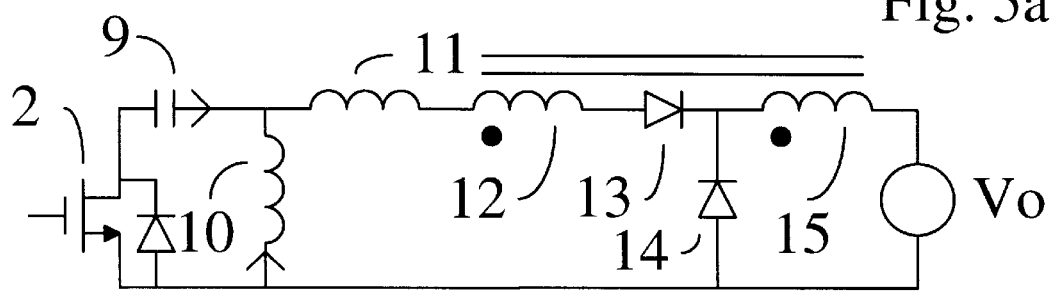

Current through capacitor 9 continuous to rise until switch 1 is turned off. The parasitic capacitance 5 keeps the voltage of switch 1 zero when it switches off and thus minimizes switching losses. Energy stored in inductor 11 charges up the parasitic capacitor 5 of switch 1 and discharges the parasitic capacitor 6 of switch 2 until the voltage across switch 2 is zero. Current is then directed through diode 4 and the voltage across switch 2 remains zero. Switch 2 is then programmed to turn on so that there is minimal switching losses. The equivalent circuit concerned is shown in FIG. 5b. In this circuit mode current through diode 13 decreases as a reverse voltage is developed across inductor 11. Inductors 12 and 15 are magnetically coupled together in such a way that voltages follow the dot sign in FIG. 3. Energy which has been stored in inductor 12 earlier on is now being delivered to inductor 15 through the magnetic link. Current through inductor 12 decreases while current through inductor 15 increases. Diode 14 is also turned on and its current increases. At this moment both diode 13 and diode 14 are conducting. The voltage across diode 14 remains zero.

Time Period [t2-t3]

Figure 5C:

Current through inductor 11 continues to fall until the current through diode 13 falls to zero and diode 13 is completely cut off at t2. Energy in inductor 12 is now completely transferred to inductor 15 and the current is conducting through diode 14. An equivalent circuit is shown in FIG. 5c. The current through inductor 15 now has a higher value than the time before switch 1 is turned off. However, this current now flows through a circuit with smaller number of components with less resistive loss. The change in current level in inductor 15 reduces overall conduction losses which will be explained in more detail in later sections. In this circuit mode inductor 15 is effectively connected across the output which has nearly constant voltage, and the current through this inductor falls at a rate determined by the output voltage. On the side of switch 2, current through inductor 10 is connected across capacitor 9 through switch 2, and current decreases linearly.

Time Period [t3-t4]

Figure 5D:
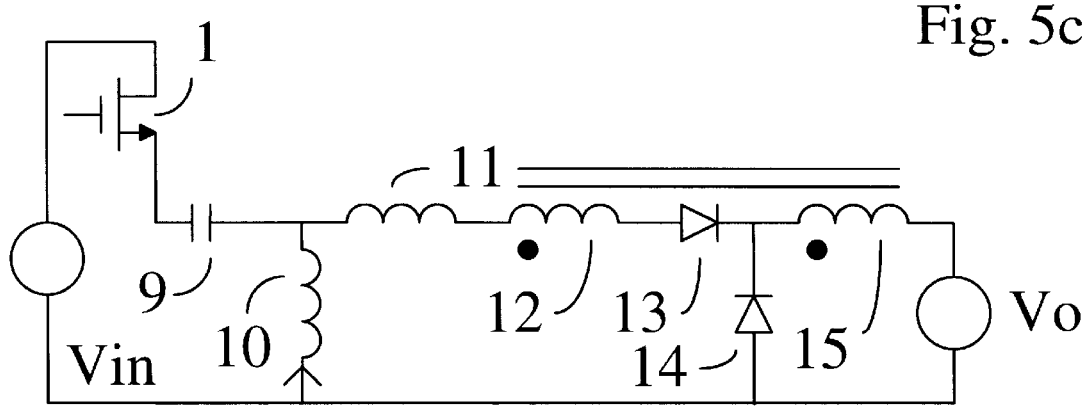

At t3 switch 2 is turned off. Parasitic capacitance 6 keeps the voltage of switch 2 zero when it switches off and thus reduces switching losses. Energy stored in inductor 10 charges up the parasitic capacitance 6 of switch 2 and discharges parasitic capacitance 5 of switch 1 until the voltage across switch 1 is zero and the anti-parallel diode 3 is turned on. Zero voltage is then developed across switch 1 which is programmed to turn on and switching losses is eliminated. An equivalent circuit is shown in FIG. 5d. In this circuit mode diode 13 starts to conduct and current through diode 14 starts to fall. At this moment both diode 13 and diode 14 are conducting and the voltages across them are assumed zero. Current through inductor 15 falls and current through inductor 12 increases as energy is transferred between the coupled inductor. This circuit mode ends when current through diode 13 has increased to the load current and diode 14 is completely cut off. The operation then continues by repeating the circuit mode as illustrated in FIG. 5a.

The average voltage across the output load is the average voltage imposed onto the output filter and is equal to the voltage across diode 14.

$$V_{out} = (V_{in} - V_{cap9} - V_{ind11} - V_{ind12}).D_e \quad (1)$$

and $$V_{ind12} = (V_{in} - V_{cap9} - V_{ind11} - V_{out}) \cdot \frac{N_{L12}}{N_{L12} + N_{L15}} \quad (2)$$

In this equation, $V_{out}$ is the average output voltage. $V_{in}$ is the input source voltage. $V_{cap9}$ is the voltage across capacitor 9, which is assumed constant in a switching cycle. $V_{ind11}$ is the voltage across inductor 11, and very often this term is small compared to other terms since the inductance of inductor 11 is small compared to that of inductor 12 and can be neglected. $N_{L12}$ and $N_{L15}$ are the number of turns of inductors 12 and 15 respectively assuming that they are wound on the same core. $D_e$ is the effective duty cycle across the output load where $$De = \frac{1}{T}(D \cdot T - (t4 - t3)) \quad (3)$$

and (t4-t3) is the time delay of waveform 26 shown in FIG. 4. In the derivation of these equations it is assumed that all switches are ideal, and the time gap between the turning off of switch 1 and turning on of switch 2 is small and negligible, and the same is applied to the time gap between the turning off of switch 2 and turning on of switch 1.

Current through inductor 15 steps up and down as shown by waveform 24 in FIG. 4. The average current through this inductor is equal to the average output load current. An approximation is made by which the waveform is a rectangular pulse train with current $I_1$ during the time period DT. Time periods [t1-t2] and [t3-t4] are assumed to be small compared to the whole time period. The load current is represented by equation (4).

$$I_{load} = I_1 \left[ D + \frac{N_{L12} + N_{L15}}{N_{L15}} (1 - D) \right] \quad (4)$$

The time period [t3-t4] is shown in FIG. 4, during this time interval both diodes 13 and 14 are conducting. An equation can be written which describes the rise in current through diode 13.

$$V_{in} - V_{cap9} + V_{out} \cdot \frac{N_{L12}}{N_{L15}} = L_{ind11} \cdot \frac{I_1}{t4 - t3} \quad (5)$$

In the time period [t1-t2], current through inductor 11 falls according to the following equation $$V_{cap9} - V_{out} \cdot \frac{N_{L12}}{N_{L15}} = L_{ind11} \cdot \frac{I_1}{t2 - t1} \quad (6)$$

In one switching cycle, the total volt-time product of inductor 11 should be equal to zero which is described in the following equation.

$$\left( V_{cap9} - V_{out} \cdot \frac{N_{L12}}{N_{L15}} \right) \cdot (t2 - t1) = \quad (7)$$

$$\left( Vin - V_{cap9} + V_{out} \cdot \frac{N_{L12}}{N_{L15}} \right) \cdot (t4 - t3)$$

In the steady state, the voltage-time integral across inductor 10 must be equal to zero in a switching cycle.

$$(V_{in} - V_{cap9}).D.T = V_{cap9}.(1-D).T$$

or $V_{cap9} = Vin.D$ (8)

Hence the average output voltage can be obtained by solving equations (1) to (8) and is represented by $$V_{out} = \frac{[V_{in}DT(N_{L12} + N_{L15}) - V_{in}D^2T(2N_{L12} + N_{L15}) - V_{in}D^3T - L_{ind11}I_{load}N_{L15}] \cdot N_{L15}}{(N_{L15} - N_{L12} \cdot D + N_{L15})^2 \cdot T} \quad (9)$$

Figure 6:
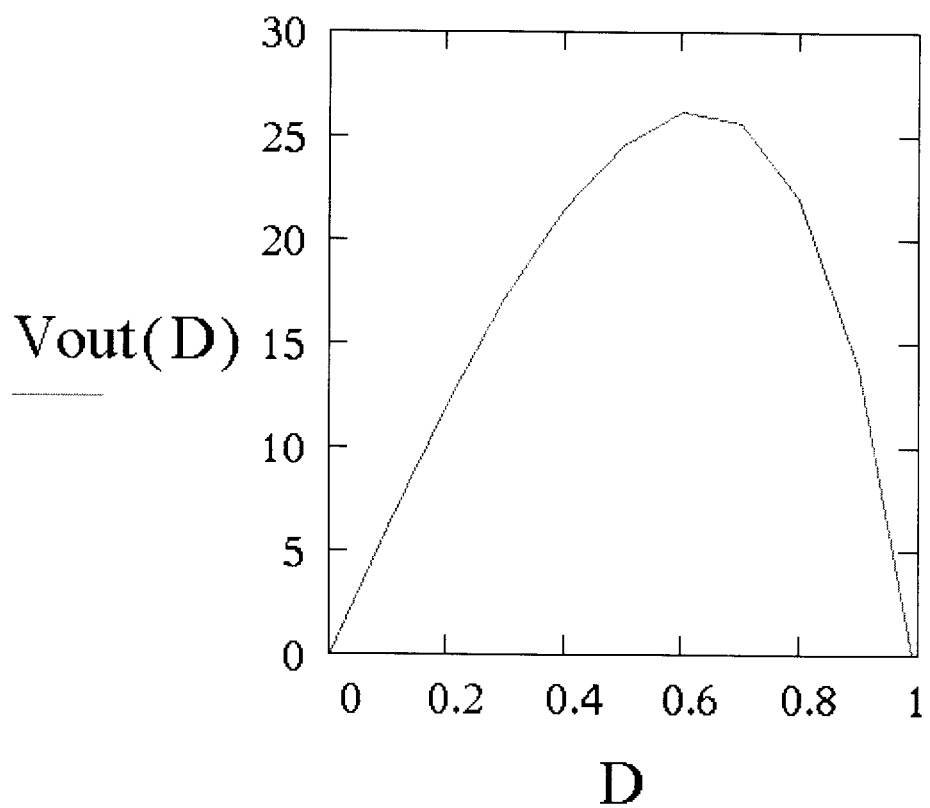
FIG. 6 shows variation of Vout with duty cycle D.

A plot of the output voltage Vout versus duty cycle D is shown in FIG. 6. The parameters used are: $V_{in}$=200V; T=6 us; $N_{L12}$=20; $N_{L15}$=10; $L_{ind11}$=1 uH; $I_{load}$=10 A.

Figure 7:
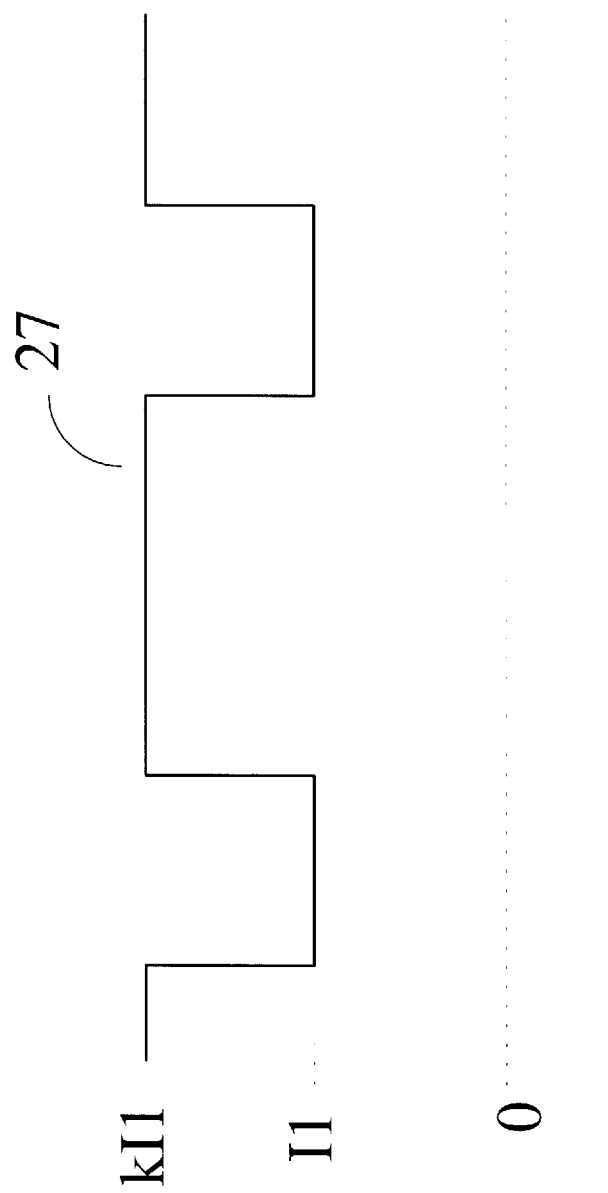
FIG. 7 shows a sketch of current waveform through the output coupled inductor of the power converter shown in FIG. 3.
Figure 8A:
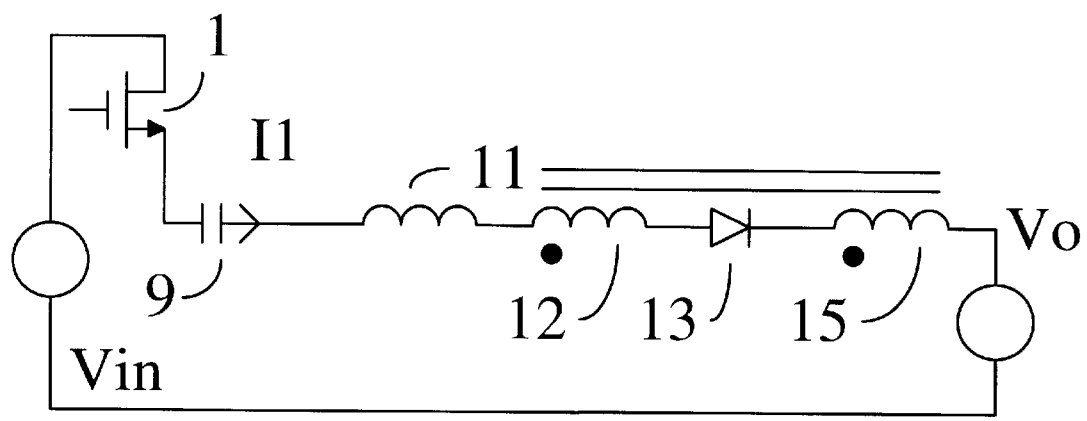
FIG. 8a–FIG. 8b represent simplified schematic drawings of switching stages for analysis of conduction losses.
Figure 8B:
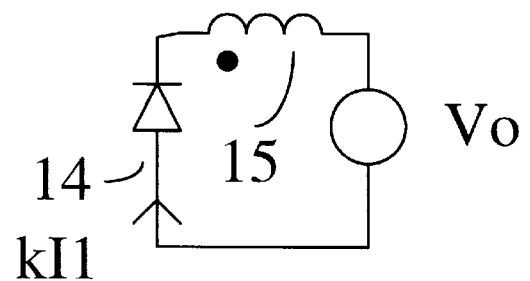
Figure 9:
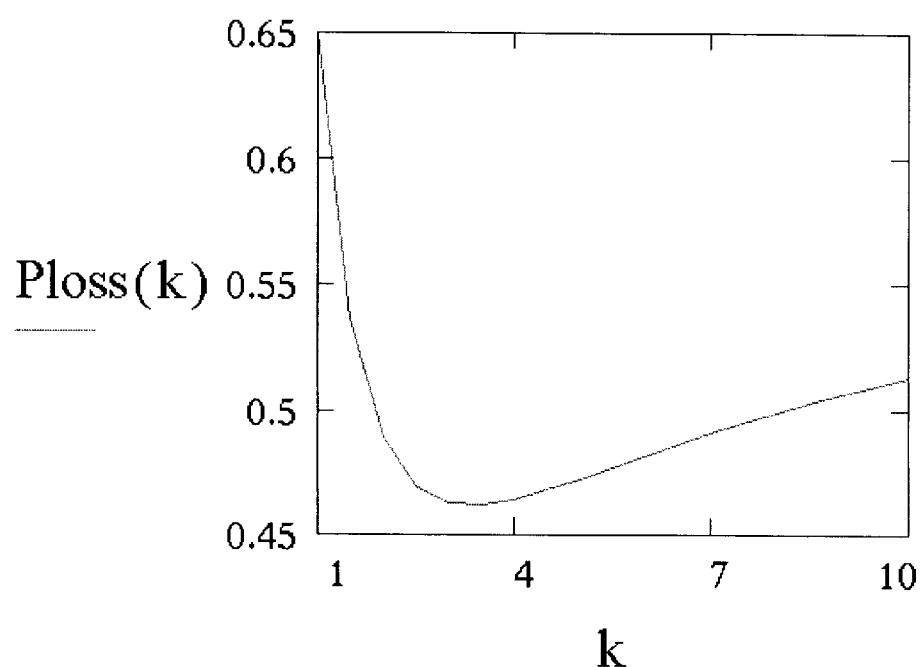
FIG. 9 shows variation of converter conduction losses with different winding ratio of the coupled inductor.

The coupled inductor arrangement of inductors 12 and 15 can bring about reduction in conduction losses. Current through inductor 15 is shown in waveform 24 of FIG. 4. For simplicity this current waveform is approximated to be rectangular pulses shown in waveform 27 of FIG. 7. In the period DT, current is $I_1$, in the period (1−DT), the current is $I_{1.k(1-D)}$ where $$k = \frac{N_{L12} + N_{L15}}{N_{L15}} \quad (10)$$

and the average load current in terms of $I_1$ is described by equation (4). With the approximation made the equivalent circuit in time period DT can be represented by FIG. 5a and the equivalent circuit in time period (1−D)T can be represented by FIG. 5c. Current through inductor 10 is mainly magnetizing current and is usually small compared to the load current and conduction losses induced by this current is neglected. In other words in the equivalent circuit in FIG. 5a the conduction loss in inductor 10 is neglected, and in FIG. 5c the conduction losses in switch 2, capacitor 9 and inductor 10 are neglected. Simplified equivalent circuits which illustrate the lossy paths are shown in FIG. 8a and FIG. 8b. Hence the total conduction losses is represented by $$P_{loss} = I_1^2 R_1 D + k^2 I_1^2 R_2 D \quad (11)$$

or $$P_{loss} = \frac{I_{load}^2}{D + k(1-D)} [R_1 D + k^2 R_2(1-D)] \qquad (12)$$

where $R_1$ is the equivalent resistance in the current path in FIG. 8a and $R_2$ is the equivalent resistance in FIG. 8b. In general $R_1$ has a higher value than $R_2$ since $R_2$ involves the resistance of inductor 15 and loss in one diode whereas $R_1$ involves the resistance of inductor 15 and loss in one diode, plus the resistance of inductor 12 and 11, capacitor 9 and switch 1. A plot of $P_{loss}$ versus the turns ratio k is shown in FIG. 9. It can be seen that losses is high in the extreme case when k=1 when $N_{L12}$ equals to zero and there is no coupled inductor. $P_{loss}$ then drops to a minimum at a certain value of k. This shows the effectiveness of the coupled inductor in conduction loss reduction compared to the case with no coupled inductor. $P_{loss}$ is minimum when $$k = \frac{R_1}{R_2} \qquad (13)$$

To summarize, the invention described is a dc to dc converter with inherent zero voltage switching to reduce switching losses and coupled inductor to reduce conduction losses.

A converter of the basic embodiment has been built for an input voltage of 128V and an output voltage of 21V. Switches 1 and 2 are realized by MOSFETs IRF830, capacitor 9 has capacitances of 0.69 uF, inductor 10 is of type E128 core with inductance 1.5 mH, inductor 11 has an inductance of 4 uH, diodes 13 and 14 are of Schottky diode type 2090, the turns ratio of inductor 12 and inductor 15 is 1:2 and capacitor 16 has capacitance of 47 uF. At an output current of 1.7 A, efficiency of 92% is recorded. The switching frequency is 167 kHz.

Figure 10:
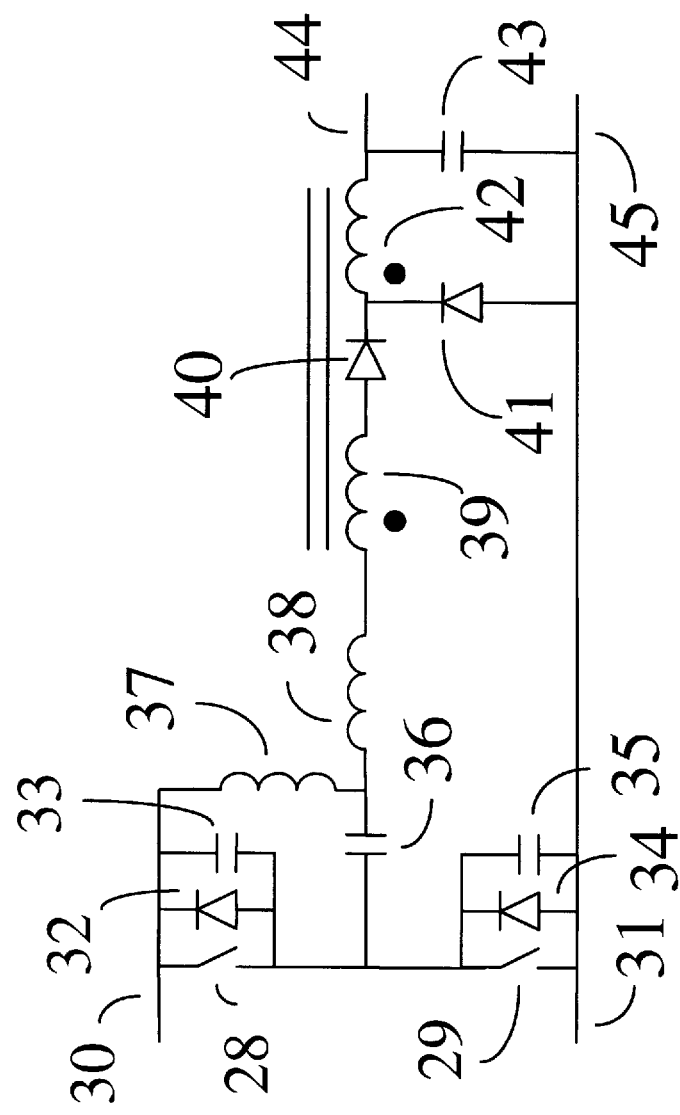
FIG. 10 is the schematic diagram of a boost converter of the converter family.

The basic embodiment so described in FIG. 3 is a step down converter which provides an output voltage lower than the input voltage. This can be modified slightly to a boost converter which provides an output voltage higher than the input voltage. The new embodiment is shown in FIG. 10. In this embodiment, inductor 37 has one end connected to the input terminal with high potential. This provides the output voltage with a different reference voltage and the output voltage is higher than the input voltage. The operation of this converter is similar to that of the basic embodiment, except that capacitor 36 is charged with a different polarity.

Figure 11:
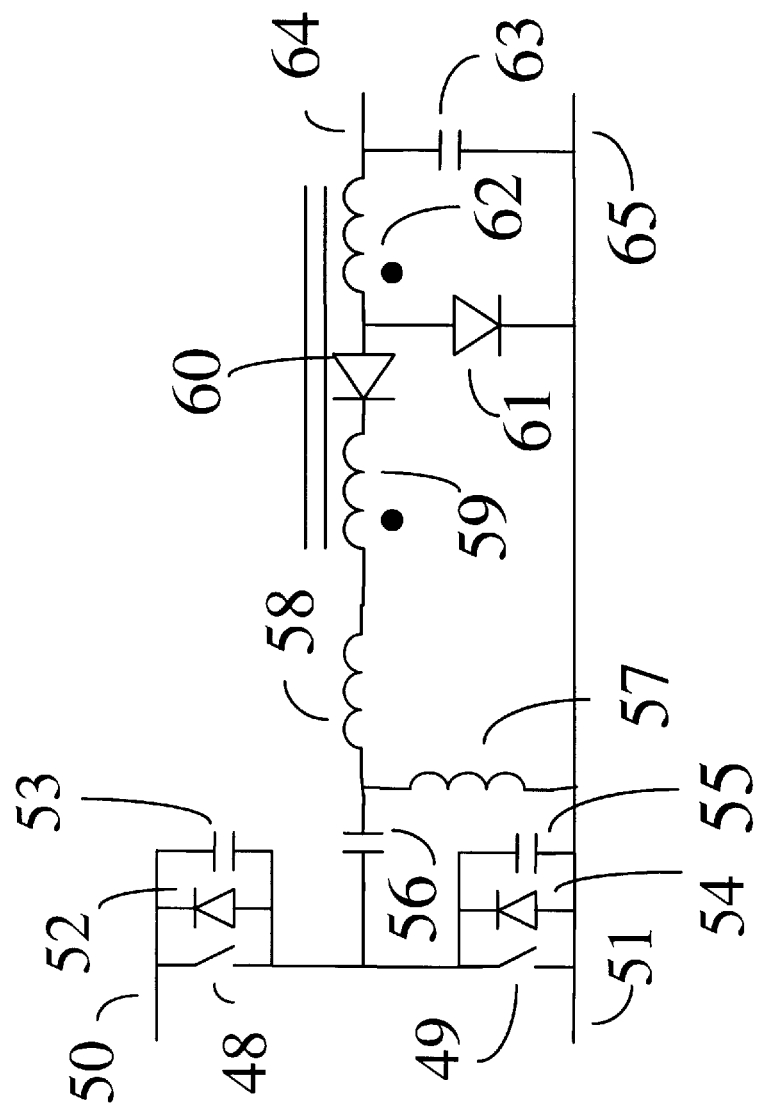
FIG. 11 is the schematic diagram of a negative output converter of the converter family.

The basic embodiment can be alternatively modified to provide negative output voltage with respect to the input voltage. Such an embodiment is shown in FIG. 11. The difference between this embodiment and the basic embodiment is that diodes 60 and 61 which are connected to the coupled inductors are connected in a reverse manner. By this arrangement, current is pushed in the reverse direction and a negative voltage is produced at the output. During operation, energy transfer takes place mainly in the (1−D)T time period rather than the DT time period in the case of the basic embodiment.

Figure 12:
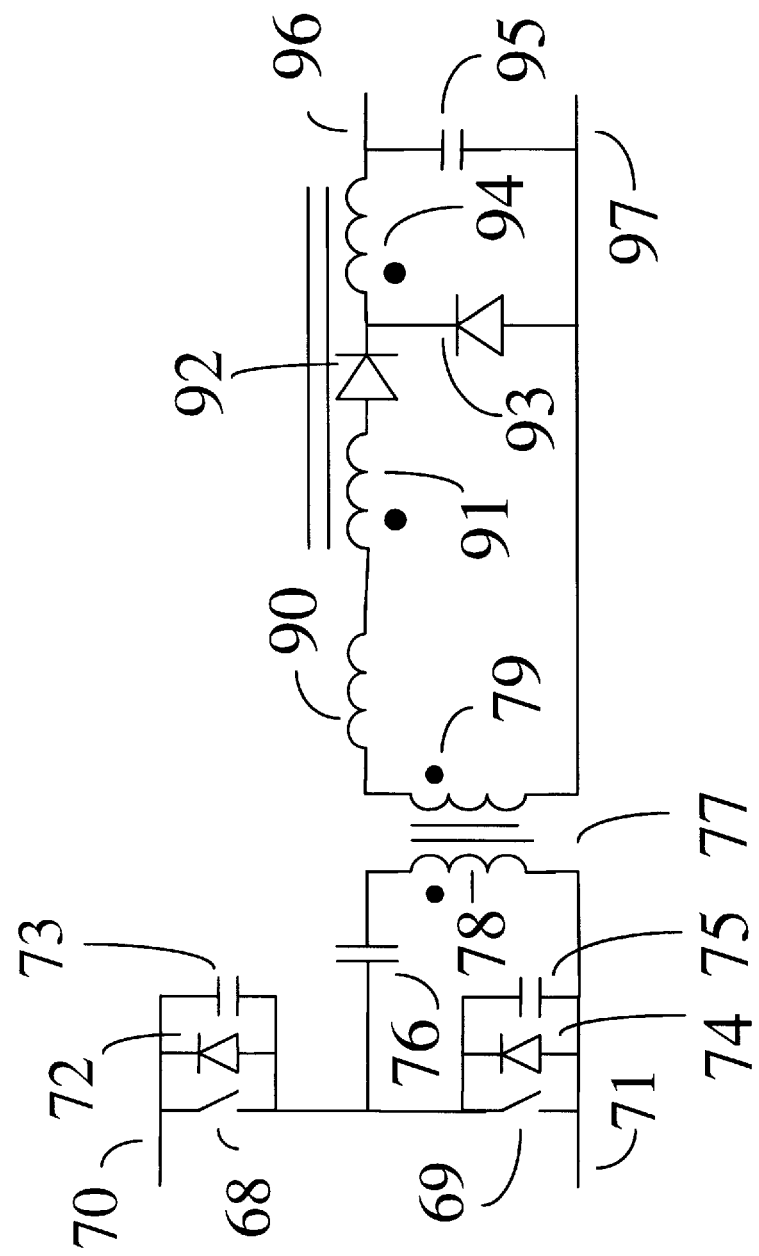
FIG. 12 is the schematic diagram of a member of the power converter family with transformer isolation.

In many applications, electrical isolation between input and out is mandatory. The present invention can be modified to provide isolation by means of a transformer. Such an embodiment is shown in FIG. 12. This embodiment is based on the basic embodiment of FIG. 3 with the replacement of inductor 10 by a transformer. This becomes the embodiment shown in FIG. 12. In this embodiment, inductor 90 can be a discrete component or it may be the leakage inductance of transformer 77.

Figure 13:
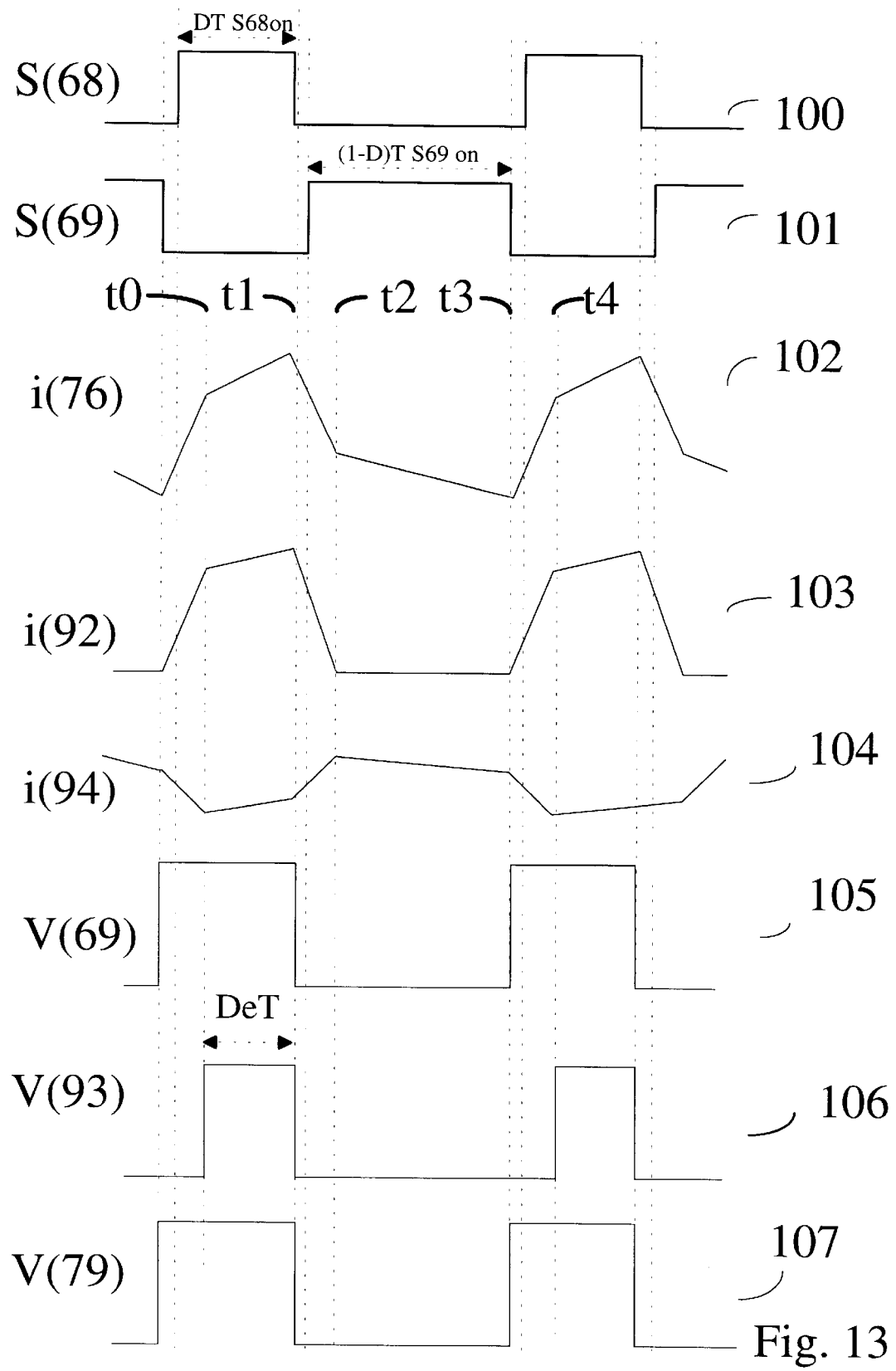
FIG. 13 shows timing diagrams which illustrate operations of the power converter shown in FIG. 12.

Switches 68 and 69 are driven on and off alternately. The driving waveforms are 100 and 101 as shown in FIG. 13. Like the basic embodiment, it is assumed that the circuit operates in the continuous mode in which current through inductor 94 does not fall to zero in the steady state.

Time Period [t0-t1]

Figure 14A:
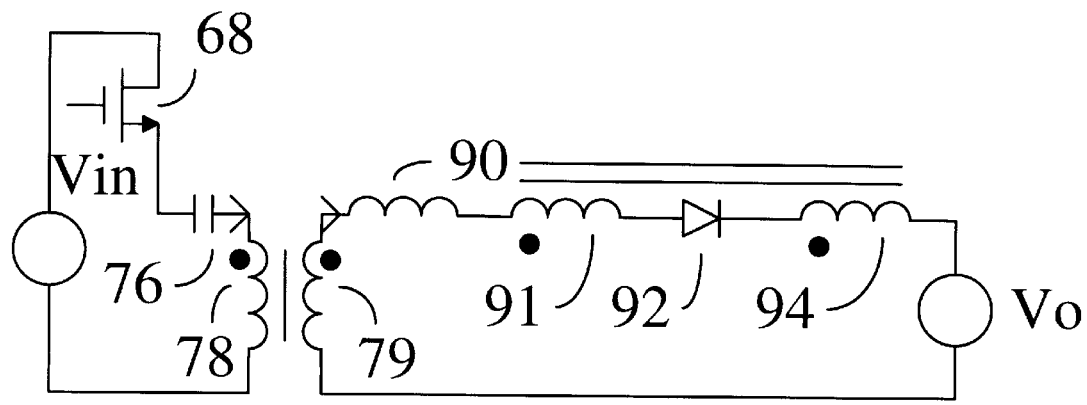
FIG. 14a–FIG. 14d represent simplified schematic drawings of switching stages of the converter shown in FIG. 12.

The circuit operation can be understood by considering the time period when switch 68 is turned on. Current flows through switch 68, capacitor 76, the primary side of the transformer; current is induced on the secondary winding 79 as shown in FIG. 14a. The output capacitor 95 is chosen to have a value large enough such that the output voltage is assumed to be constant within a switching cycle. It is assumed that filter inductor 94 has a value large enough such that current through it remains non zero within a switching cycle, in other words the converter operates in the continuous conduction mode. In this time period energy is delivered to the output load. Capacitor 76 is chosen to have a value large enough so that its voltage can be considered constant within one switching cycle. Since inductors 91 and 94 are magnetically coupled together and wound on the same core, physically it looks as if they were a single lumped inductor. In this circuit mode the voltage induced on the secondary side can be controlled by the turns ratio of transformer 77, and this gives engineers one more design parameter to manipulate in addition to the isolation feature.

Time Period [t1-t2]

Figure 14B:
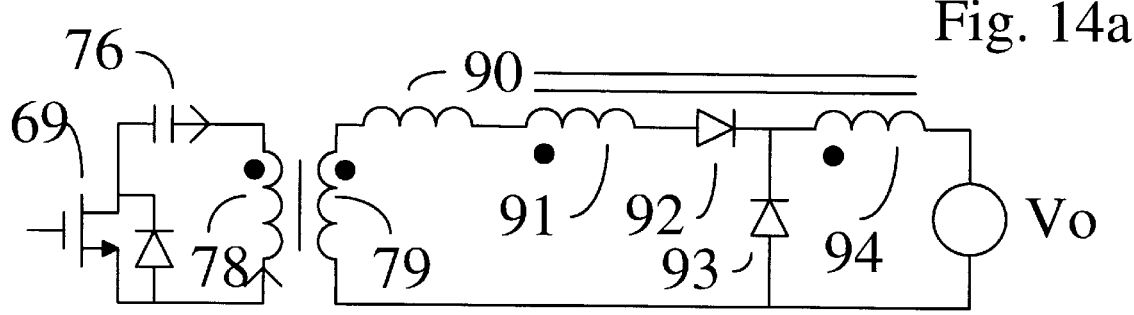

Current through capacitor 76 continuous to rise until switch 68 is turned off. Parasitic capacitance 73 keeps the voltage of switch 68 zero when it switches off and thus minimizes switching losses. Energy stored in inductor 90 charges up parasitic capacitor 73 of switch 68 and discharges parasitic capacitor 75 of switch 69 until the voltage across switch 69 is zero. Current is then directed through diode 74 and keeps the voltage across switch 69 zero. Switch 69 is then programmed to turn on so that there is no switching losses. The equivalent circuit is shown in FIG. 14b. In this circuit mode current through diode 92 decreases as a reverse voltage is developed across inductor 90. Inductors 91 and 94 are magnetically coupled together in such a way that the voltages induced follow the dot sign of the inductors. Energy which has been stored in inductor 91 earlier on is now being delivered to inductor 94 through the magnetic link. Current through inductor 91 decreases while current through inductor 94 increases. Diode 93 is also turned on and its current increases. At this moment both diode 92 and diode 93 are conducting. The voltage across diode 93 remains zero.

Time Period [t2-t3]

Figure 14C:
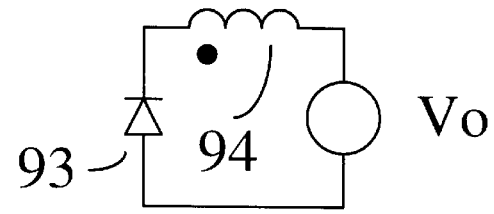

Current through inductor 90 continues to fall until the current through diode 92 falls to zero and diode 92 is completely cut off at t2. Energy in inductor 91 is now completely transferred to inductor 94 and current is conducting through diode 93. An equivalent circuit is shown in FIG. 14c. Current through inductor 94 now has a higher value than the time before switch 68 is turned off. However, this current now flows through a circuit with smaller number of components which has less resistive loss. The change in current level in inductor 94 reduces overall conduction losses which will be explained in more detail in later sections. In this circuit mode inductor 94 is effectively connected across the output which has nearly constant voltage, and the current through this inductor falls at a rate determined by the output voltage. On the side of switch 69, current through the transformer primary winding 78 is connected across capacitor 76 through switch 69, and current decreases linearly.

Time Period [t3-t4]

Figure 14D:
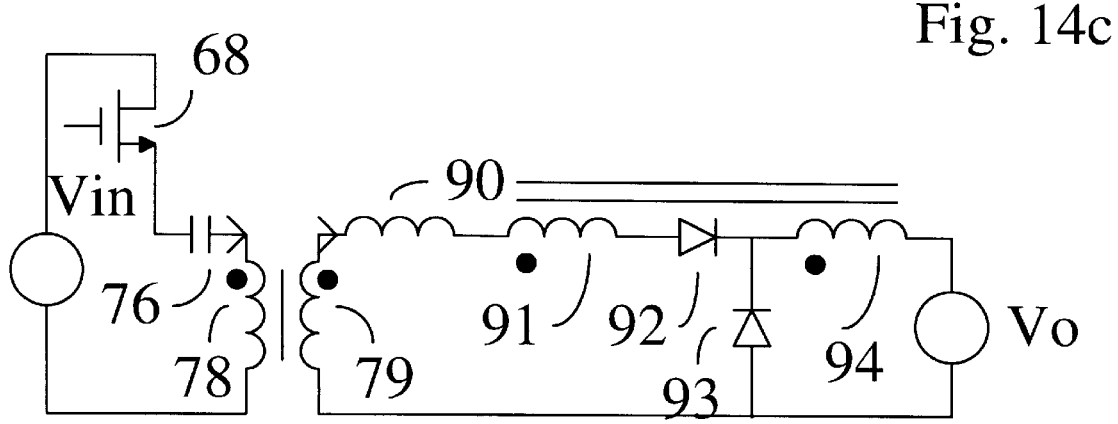

At t3 switch 69 is turned off. Parasitic capacitance 75 keeps the voltage of switch 69 zero when it switches off and thus reduces switching losses. Energy stored in the transformer primary winding 78 charges up the parasitic capacitance 75 of switch 69 and discharges parasitic capacitance 73 of switch 68 until the voltage across switch 68 is zero and the anti-parallel diode 72 is turned on. Zero voltage is then developed across switch 68 and it is programmed to turn on and switching losses is reduced. An equivalent circuit is shown in FIG. 14d. In this circuit mode diode 92 starts to conduct and current through diode 93 starts to fall. At this moment both diode 92 and diode 93 are conducting and voltages across them are assumed zero. Current through inductor 94 falls and current through inductor 91 increases as energy is transferred between the coupled inductors. This circuit mode ends when current through diode 92 has increased to the level of load current and diode 93 is completely cut off. The operation then continues by repeating the circuit modes as illustrated in FIGS. 14.

Average output voltage is equal to the average voltage imposed onto the output filter which is in turn the voltage across diode 93. This is given by equation (14).

$$V_{out} = \left[ (V_{in} - V_{cap76}) \cdot \frac{N_{79}}{N_{78}} - V_{ind90} - V_{ind91} \right] \cdot D_e \quad (14)$$

Furthermore $$V_{ind91} = \left[ (V_{in} - V_{cap76}) \cdot \frac{N_{79}}{N_{78}} - V_{ind90} - V_{out} \right] \cdot \frac{N_{L91}}{N_{L91} + N_{L94}} \quad (15)$$

In equations (14) and (15), $V_{out}$ is the average output voltage. $V_{in}$ is the input source voltage. $V_{cap76}$ is the voltage across capacitor 76, which is assumed constant in a switching cycle. $V_{ind90}$ is the voltage across inductor 90, and very often this term is small compared to other terms since the inductance of inductor 90 is small compared to that of inductor 91 and can be neglected. $N_{78}$ and $N_{79}$ are the number of turns of the primary and secondary transformer windings. $N_{L91}$ and $N_{L94}$ are number of turns of inductors 91 and 94 respectively assuming that they are wound on the same core. $D_e$ is the effective duty cycle across the output load where $$De = \frac{1}{T}(D \cdot T - (t4 - t3)) \quad (16)$$

and (t4-t3) is the time delay of waveform 106 shown in FIG. 13. In deriving these equations it is assumed that all switches are ideal, and the time gap between turning off of switch 68 and turning on of switch 69 is small and negligible, and the same is applied to the time gap between the turning off of switch 69 and turning on of switch 68.

Current through inductor 94 steps up and down as shown by waveform 104 in FIG. 13. The average current through this inductor is equal to the average load current. An approximation is made by which the waveform is a rectangular pulse train with current $I_1$ during the time period DT. Time periods [t1-t2] and [t3-t4] are assumed to be small compared to the whole time period. The load current is represented by equation (17).

$$I_{load} = I_1 \left[ D + \frac{N_{L91} + N_{L94}}{N_{L94}}(1 - D) \right] \quad (17)$$

The time period [t3-t4] is shown in FIG. 13. During this time interval both diodes 92 and 93 are conducting. An equation can be written which describes the rise in current through diode 92.

$$(V_{in} - V_{cap76}) \cdot \frac{N_{79}}{N_{78}} + V_{out} \cdot \frac{N_{L91}}{N_{L94}} = L_{ind90} \cdot \frac{I_1}{t4 - t3} \quad (18)$$

In the time period [t1-t2], the current through inductor 90 falls according to the following equation $$V_{cap76} \cdot \frac{N_{79}}{N_{78}} - V_{out} \cdot \frac{N_{L91}}{N_{L94}} = L_{ind90} \cdot \frac{I_1}{t2 - t1} \quad (19)$$

In one switching cycle, the total volt-time product of inductor 90 should be equal to zero which is described by equation (20).

$$\left( V_{cap76} \cdot \frac{N_{79}}{N_{78}} - V_{out} \cdot \frac{N_{L91}}{N_{L94}} \right) \cdot (t2 - t1) = \left[ (Vin - V_{cap76}) \cdot \frac{N_{79}}{N_{78}} + V_{out} \cdot \frac{N_{L91}}{N_{L94}} \right] \cdot (t4 - t3) \quad (20)$$

In the steady state, voltage-time integral across the primary side must be equal to zero in a switching cycle.

$$(V_{in} - V_{cap76}) \cdot D \cdot T = V_{cap76} \cdot (1-D) \cdot T$$

or $V_{cap76} = V_{in} \cdot D \quad (21)$

Hence the average output voltage can be obtained by solving equations (14) to (21) and is represented by equation (22).

$$Vout = \left[ \frac{(N_{79} \cdot N_{L91} + N_{79} \cdot N_{L94}) \cdot Vin \cdot D \cdot T - (2N_{79} \cdot N_{L91} + N_{L91} \cdot N_{79})Vin \cdot D^2 T}{(-N_{L91} + N_{L91}D - N_{L94})^2 T} + \frac{N_{79}N_{L91}V_{in}D^3T + L_{ind90}I_{load}N_{L94}N_{78}}{(-N_{L91} + N_{L91}D - N_{L94})^2 T} \right] \cdot \frac{N_{L94}}{N_{78}} \quad (22)$$

Figure 15:
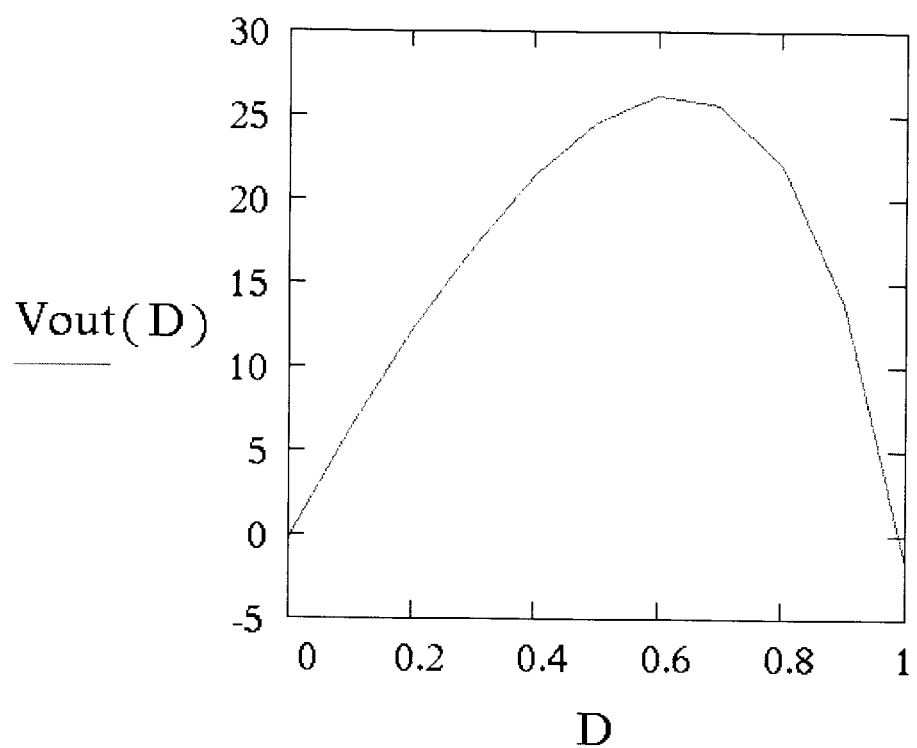
FIG. 15 shows variation of Vout with duty cycle D of converter shown in FIG. 12.

A plot of the output voltage Vout versus duty cycle D is shown in FIG. 15. This is very similar to the basic embodiment with no transformer. The parameters used are: $V_{in}$=200V; T=6 us; $N_{L91}$=20; $N_{L94}$=10; $L_{ind90}$=1 uH; $I_{load}$=10 A; $N_{78}$=$N_{79}$=40.

Loss analysis of this coupled output inductor circuit is very similar to that of the basic converter.

Figure 16:
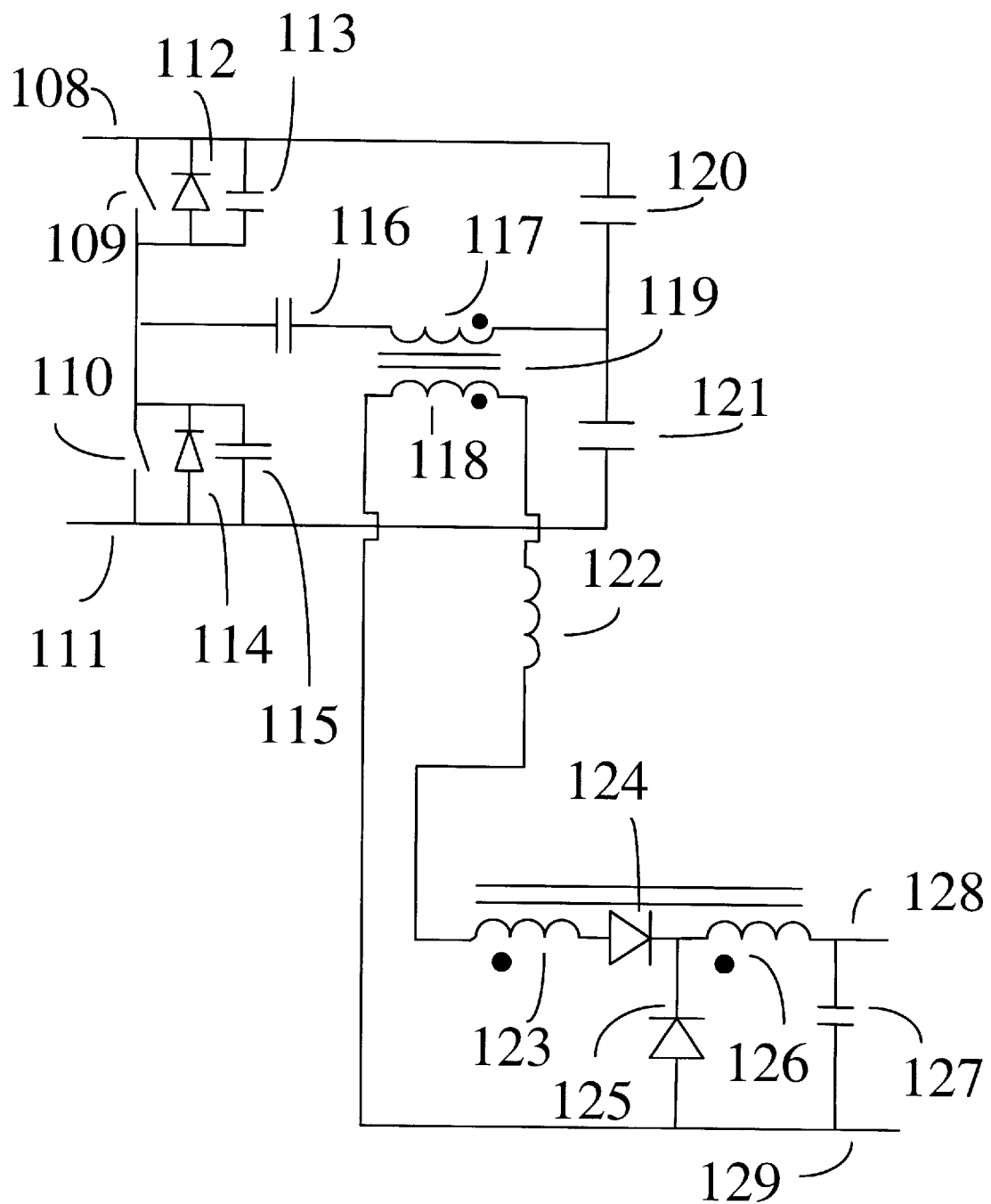
FIG. 16 is the schematic diagram of a half bridge converter of the converter family.

The embodiment with transformer can be modified to another embodiment with half bridge configuration shown in FIG. 16. One end of the transformer primary winding is connected to the junction of two capacitors connect across the input terminals. These two capacitors 120 & 121 concerned have capacitance which are sufficiently large so that these two capacitors can be regarded as voltage sources with stable voltage in time scale of one switching cycle. The driving method of the two main switches remains the same as the basic embodiment whereby switches 109 and 110 turn on and off alternately with a small time gap in the between the turning on and turning off. The operation is also very similar to that of the embodiment with transformer in FIG. 12.

Figure 17:
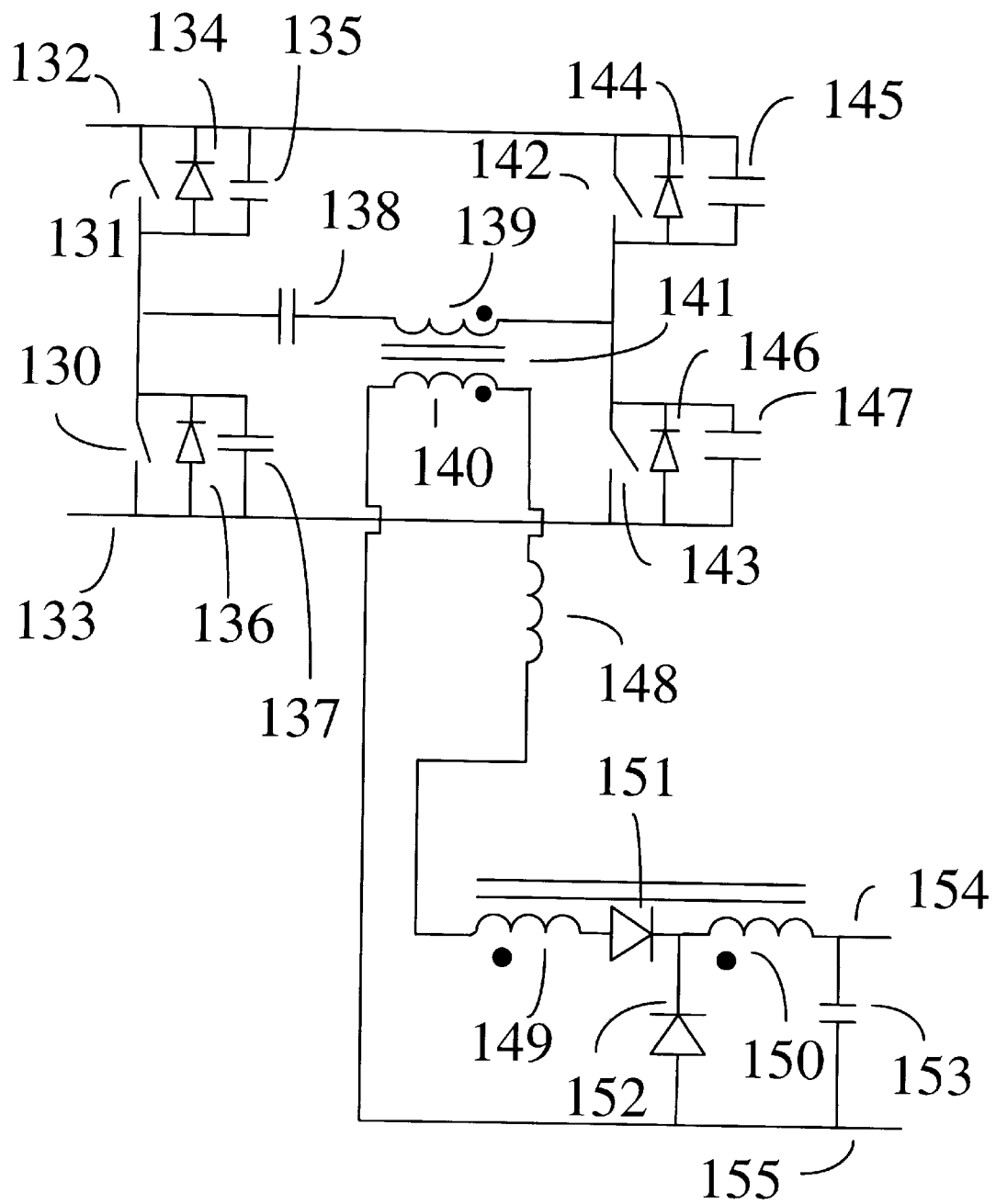
FIG. 17 is the schematic diagram of a full bridge converter of the converter family.

The embodiment with transformer can be further modified to another embodiment with full bridge configuration shown in FIG. 17. The transformer primary winding is connected across two branches of switches, each branch consists of two switches switching on and off alternately. Switches 130 and 142 are synchronized, and switches 131 and 143 are synchronized. The driving method of the two sets of switches remains the same as the basic embodiment. Switch pair 130/142 and pair 131/143 are turned on and off alternately with a small time gap in the between the turning on and turning off. The operation is also very similar to that of the embodiment with transformer in FIG. 12. However, the full bridge embodiment provides double voltage exposure to the transformer primary winding, and enable power transfer at a lower primary current.

We claim:

1. A power converter comprising:
    a first input terminal and a second input terminal for connection to a DC source;
    a first output terminal and a second output terminal for connection to a DC load;
    a first and a second switch means each having at least a first and a second switch terminal, the first switch and the second switch being connected in series and coupled to the first and second input terminals;
    a first diode connected in parallel with the first switch, with its cathode connected to the input terminal with higher potential;
    a second diode connected in parallel with the second switch, with its anode connected to the input terminal with lower potential, the first and second diode may be combined part of the first and second switch respectively;
    a first capacitor connected in parallel with the first diode;
    a second capacitor connected in parallel with the second diode, the first and second capacitor may be combined part of the first and second switch respectively;
    means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;
    means by which the first switch closed when the voltage across this switch is substantially zero;
    means by which the second switch closed when the voltage across this switch is substantially zero;
    a third capacitor which is coupled to a node joining the first switch and the second switch;
    a first inductor with one of its two terminals connected to the third capacitor, and the other terminal connected to the input terminal with lower potential;
    a second inductor with the first of its two terminals connected to a node joining the third capacitor and the first inductor;
    a third inductor with the first of its two terminals connected to the second terminal of the second inductor;
    a third diode with its cathode connected to the cathode of a fourth diode, and the anode of this third diode is connected to the second terminal of the third inductor;
    a fourth diode with its cathode connected to the cathode of the third diode, and the anode of this fourth diode is connected to a node joining the input terminal with lower potential;
    a fourth inductor with the first of its two terminals connected to a node joining the cathodes of the third and the fourth diode;
    magnetic means which couples the third inductor and the fourth inductor magnetically;
    a fourth capacitor with the first of its two terminals connected to the second terminal of the fourth inductor, the two terminals of the fourth capacitor are connected to the output terminals;
    a connection connecting the output terminal with lower potential and the input terminal with lower potential.

2. A power converter comprising:
    a first input terminal and a second input terminal for connection to a DC source;
    a first output terminal and a second output terminal for connection to a DC load;
    a first and a second switch means each having at least a first and a second switch terminal, the first switch and the second switch being connected in series and coupled to the first and second input terminals;
    a first diode connected in parallel with the first switch, with its cathode connected to the input terminal with higher potential;
    a second diode connected in parallel with the second switch, with its anode connected to the input terminal with lower potential, the first and second diode may be combined part of the first and second switch respectively;
    a first capacitor connected in parallel with the first diode;
    a second capacitor connected in parallel with the second diode, the first and second capacitor may be combined part of the first and second switch respectively;
    means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;
    means by which the first switch closed when the voltage across this switch is substantially zero;
    means by which the second switch closed when the voltage across this switch is substantially zero;
    a third capacitor which is coupled to a node joining the first switch and the second switch;
    a first inductor with one of its two terminals connected to the third capacitor, and the other terminal connected to the input terminal with higher potential;
    a second inductor with the first of its two terminals connected to a node joining the third capacitor and the first inductor;
    a third inductor with the first of its two terminals connected to the second terminal of the second inductor;
    a third diode with its cathode connected to the cathode of a fourth diode, and the anode of this third diode is connected to the second terminal of the third inductor;
    a fourth diode with its cathode connected to the cathode of the third diode, and the anode of this fourth diode is connected to a node joining the input terminal with lower potential;

a fourth inductor with the first of its two terminals connected to a node joining the cathodes of the third and the fourth diode;

magnetic means which couples the third inductor and the fourth inductor magnetically;

a fourth capacitor with the first of its two terminals connected to the second terminal of the fourth inductor, the two terminals of the fourth capacitor are connected to the output terminals;

a connection connecting the output terminal with lower potential and the input terminal with lower potential.

3. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;

means by which the first switch closed when the voltage across this switch is substantially zero;

means by which the second switch closed when the voltage across this switch is substantially zero;

a third capacitor which is coupled to a node joining the first switch and the second switch;

a first inductor with one of its two terminals connected to the third capacitor, and the other terminal connected to the input terminal with lower potential;

a second inductor with the first of its two terminals connected to a node joining the third capacitor and the first inductor;

a third inductor with the first of its two terminals connected to the second terminal of the second inductor;

a third diode with its anode connected to the anode of a fourth diode, and the cathode of the third diode is connected to the second terminal of the third inductor;

a fourth diode with its anode connected to the anode of the third diode, and the cathode of the fourth diode is connected to the node joining the input terminal with lower potential;

a fourth inductor with the first of its two terminals connected to a node joining the anodes of the third and the fourth diode;

magnetic means which couples the third inductor and the fourth inductor magnetically;

a fourth capacitor with the first of its two terminals connected to the second terminal of the fourth inductor, the two terminals of the fourth capacitor are connected to the output terminals;

a connection connecting the output terminal with lower potential and the input terminal with lower potential.

4. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;

means by which the first switch closed when the voltage across this switch is substantially zero;

means by which the second switch closed when the voltage across this switch is substantially zero;

a third capacitor which is coupled to a node joining the first switch and the second switch;

a first transformer having a primary winding and a secondary winding, each winding has two terminals, the first terminal of the primary winding is connected to the third capacitor, and the second terminal is connected to input terminal with lower potential; the first terminal of the secondary winding is connected to a first inductor, and the second terminal is connected to the output terminal with lower potential;

a first inductor with the first of its two terminals connected to the secondary winding of the first transformer, and its second terminal is connected to a second inductor;

a second inductor with the first of its two terminals connected to the first inductor and the second terminal connected to a third diode;

a third diode with its anode connected to the second terminal of the second inductor and its cathode connected to the cathode of a fourth diode;

a fourth diode with its cathode connected to the cathode of the third diode, and the anode of this fourth diode is connected to a node joining the input terminal with lower potential;

a fourth inductor with the first of its two terminals connected to a node joining the cathodes of the third and the fourth diode;

magnetic means which couples the third inductor and the fourth inductor magnetically;

a fourth capacitor with the first of its two terminals connected to the second terminal of the fourth inductor, the two terminals of the fourth capacitor are connected to the output terminals.

5. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;

means by which the first switch closed when the voltage across this switch is substantially zero;

means by which the second switch closed when the voltage across this switch is substantially zero;

a third capacitor which is coupled to a node joining the first switch and the second switch;

a fourth and a fifth capacitor which are connected in series and this series combination is connected to the two input terminals;

a first transformer having a primary winding and a secondary winding, each winding has two terminals, the first terminal of the primary winding is connected to the third capacitor, and the second terminal is connected to a node joining the fourth and the fifth capacitor, the first terminal of the transformer secondary winding is connected to a first inductor, and the second terminal is connected to the output terminal with lower potential;

the first inductor with the first of its two terminals connected to the secondary winding of the first transformer, and its second terminal is connected to a second inductor;

the second inductor with the first of its two terminals connected to the first inductor and the second terminal connected to the anode of a third diode;

the third diode with its anode connected to the second terminal of the second inductor and its cathode connected to the cathode of a fourth diode;

the fourth diode with its cathode connected to the cathode of the third diode, and the anode of this fourth diode is connected to a node joining the output terminal with lower potential;

a third inductor with the first of its two terminals connected to a node joining the cathodes of the third and the fourth diode, and the other terminal connected to a sixth capacitor;

magnetic means which couples the second inductor and the third inductor magnetically;

the sixth capacitor with the first of its two terminals connected to the third inductor, the other terminal of this capacitor is connected to the output terminal with lower potential, the two output terminals are connected to this sixth capacitor.

6. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

means by which the first and second switches periodically and alternately closing, the first switch closed for a first time period and the second switch closed for a second time period, a third time period during which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;

means by which the first switch closed when the voltage across this switch is substantially zero;

means by which the second switch closed when the voltage across this switch is substantially zero;

a third and a fourth switch means each having at least a first and a second switch terminal, the third switch and the fourth switch are connected in series and coupled to the first and second input terminals;

a third diode connected in parallel with the third switch, with its cathode connected to the input terminal with higher potential, a fourth diode connected in parallel with the fourth switch, with its anode connected to the input terminal with lower potential, the third and fourth diode may be combined part of the third and fourth switch respectively;

a third capacitor connected in parallel with the third diode;

a fourth capacitor connected in parallel with the fourth diode, the third and fourth capacitor may be combined part of the third and fourth switch respectively;

a fifth capacitor which is coupled to a node joining the first switch and the second switch;

a first transformer having a primary winding and a secondary winding, each winding has two terminals, the first terminal of the primary winding is connected to the third capacitor, and the second terminal is connected to a node joining the third and the fourth switches, the first terminal of the transformer secondary winding is connected to a first inductor, and the second terminal is connected to the output terminal with lower potential;

a first inductor with the first of its two terminals connected to the secondary winding of the first transformer as described, and its second terminal is connected to a second inductor;

the second inductor with the first of its two terminals connected to the first inductor and the second terminal connected to a fifth diode;

the fifth diode with its anode connected to the second terminal of the second inductor and its cathode connected to the cathode of a sixth diode;

the sixth diode with its cathode connected to the cathode of the third diode, and the anode of this sixth diode is connected to a node joining the output terminal with lower potential;

a third inductor with the first of its two terminals connected to a node joining the cathodes of the fifth and the sixth diode, and the other terminal connected to a sixth capacitor;

magnetic means which couples the second inductor and third inductor magnetically;

the sixth capacitor with the first of its two terminals connected to the third inductor, the other terminal of this capacitor is connected to the output terminal with lower potential, the two output terminals are connected to this sixth capacitor.

* * * * *